Sept. 19, 1933.   R. M. CHESNEY   1,927,783
ROTARY CUTTER FOR MAKING EXPANDED METAL
Filed June 19, 1929   2 Sheets-Sheet 1
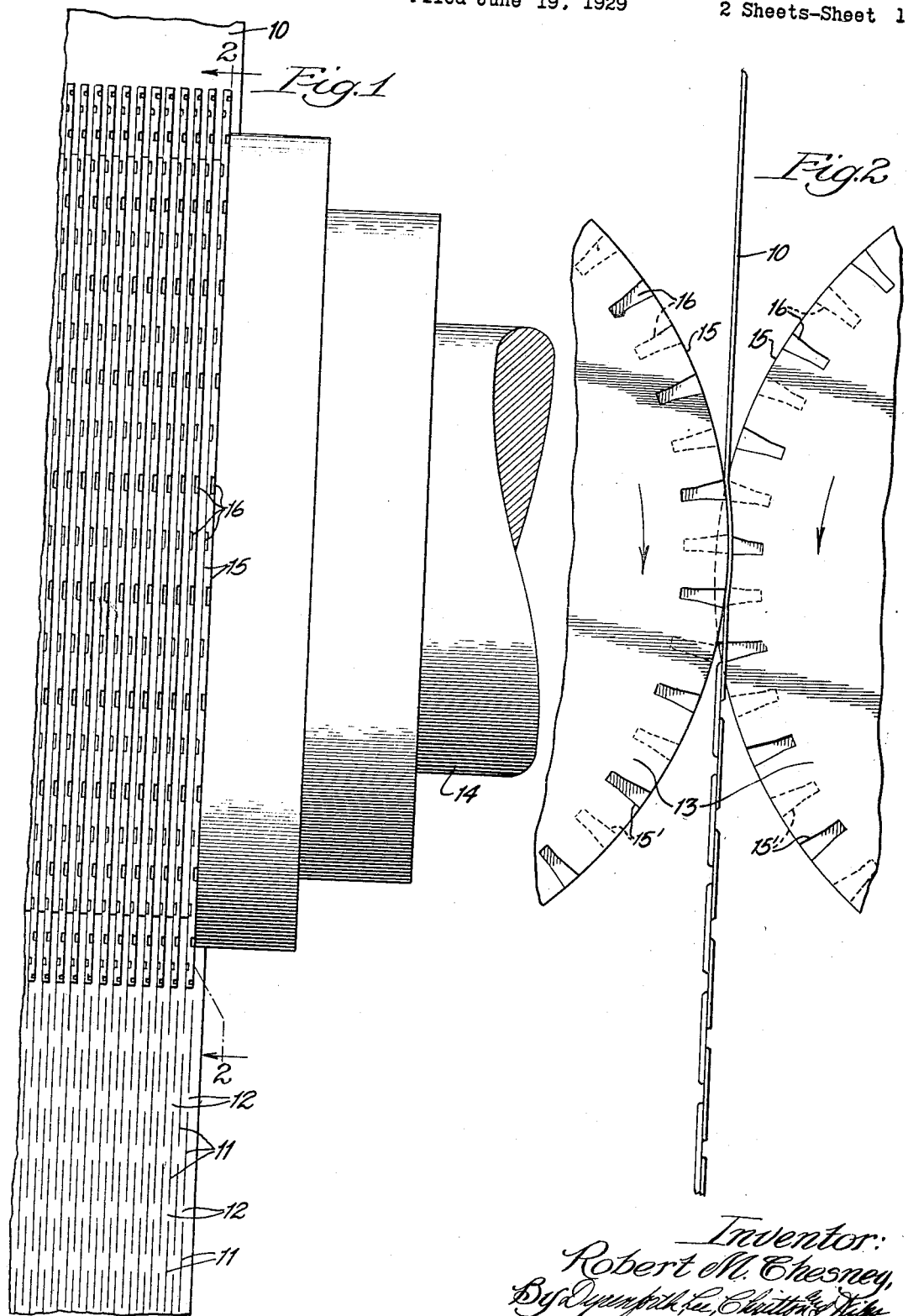

Sept. 19, 1933.    R. M. CHESNEY    1,927,783
ROTARY CUTTER FOR MAKING EXPANDED METAL
Filed June 19, 1929    2 Sheets-Sheet 2
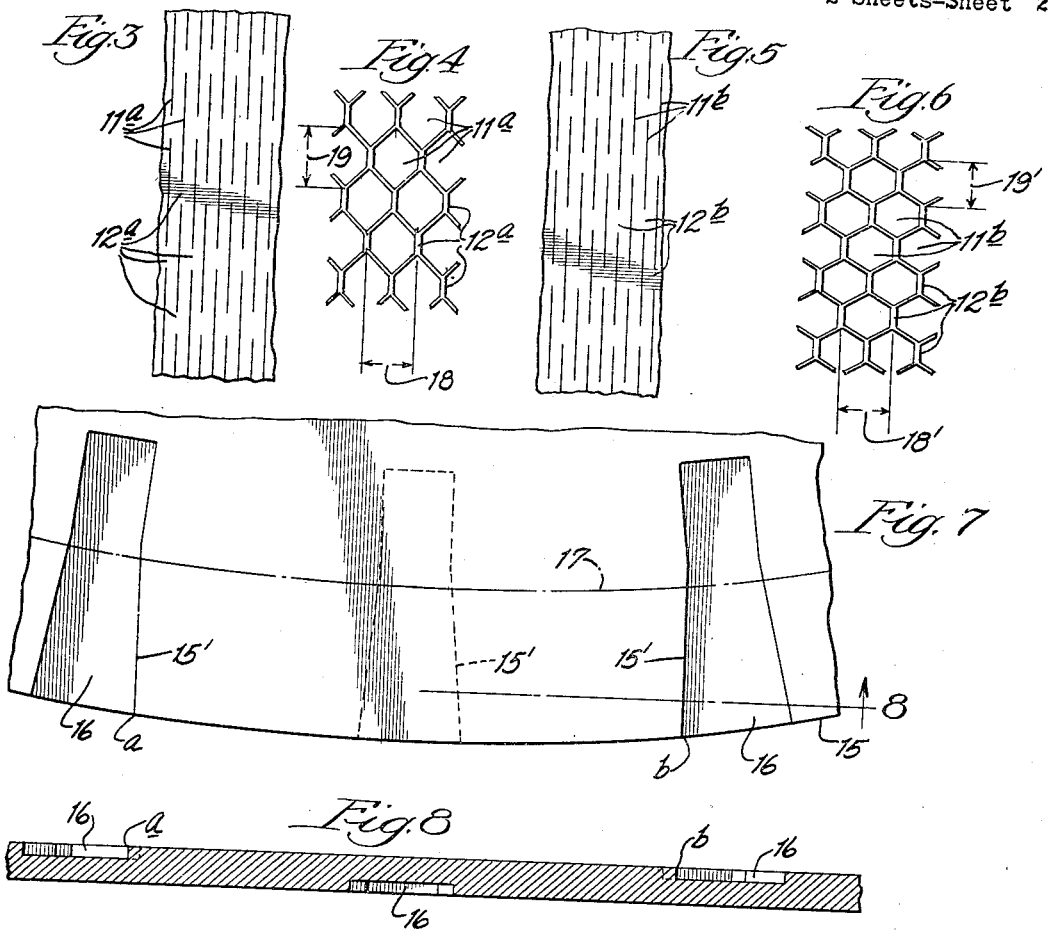
Inventor:
Robert M. Chesney,
By Dympkee, Clifton & Niles,
Attys.

Patented Sept. 19, 1933

1,927,783

UNITED STATES PATENT OFFICE 1,927,783

ROTARY CUTTER FOR MAKING EXPANDED METAL

Robert M. Chesney, Warren, Ohio, assignor, by mesne assignments, to United States Gypsum Company, Chicago, Ill., a corporation of Illinois Application June 19, 1929. Serial No. 372,165

5 Claims. (Cl. 164—6.6)

This invention relates to improvements in rotary cutters and, more especially, rotary cutters for making expanded metal.

Cutters of the type to which my invention relates are formed to cut rows of slits in the metal, the slits in a row being separated by bonds. The slits of one row are ordinarily staggered with respect to those of an adjacent row. In order to form the alternate slits and bonds of one row, the cutters are provided with notches, it being understood that the unnotched portion of the cutter makes the slit in the metal, the notched portion not cutting the metal and, consequently, leaving the bond.

In the use of the cutters, the cutting portions become dulled and must be sharpened. In the sharpening process, the diameter of the rotary cutter is necessarily somewhat reduced. Heretofore, it has been the practice to make the notches on the cutters with parallel sides. The cutting portions of the cutters were consequently substantially sector-shape. With such cutters, it will be seen that as the same are sharpened and the diameter reduced, the notches remain the same width while the cutting portions become narrower due to their sector shape. Consequently, such old type of cutters, when reduced in diameter, give shorter slits in the metal to be expanded.

The principal feature of my invention is the making of a cutter that will continue to give slits of the same length (the length of the bond being reduced) as it is reduced in diameter by sharpening. This is of considerable advantage because if the length of the slit in the metal is reduced, the resulting expanded metal will be shortened. By the use of my invention, the completed expanded metal is not shortened as the diameter of the cutter is reduced. These features and the details of the invention will be understood more fully as I proceed with my specification.

In that form of device embodying the features of my invention shown in the accompanying drawings—

Figure 1 is a top plan view of a cutter; Fig. 2 is a view taken as indicated by the line 2—2 of Fig. 1; Figs. 3, 4, 5 and 6 show the effect of reducing the length of slits in making expanded metal; Fig. 7 is an enlarged view of a portion of the periphery of one of the cutters; and Fig. 8 is a view taken as indicated by the line 8 of Fig. 7.

As shown in Fig. 1, the sheet metal being slitted is indicated by 10, the slits therein being indicated by 11. Numeral 12 indicates the bond between two slits.

The slitting is accomplished by a plurality of pairs of rotary cutters, indicated, in general, by 13, 13, one operating above and one below the metal 10 in shearing relation, as shown in Fig. 2. The mechanism for rotating the cutters, for feeding the metal between the same, and the like, form no part of the present invention and need not be shown in detail here as these mechanisms are well known and understood in the art. Numeral 14 may indicate, in general, a shaft on which the rotary cutters 13, 13 are mounted.

A portion of the periphery of one of the cutters is shown on an enlarged scale in Figs. 7 and 8. As here shown, the cutting portions of the periphery or blades of the cutters are indicated by 15. For example, as shown in Fig. 7, one blade 15 adapted to make one slit 11 in the metal extends from the point $a$ to the point $b$. It is to be understood that there is a co-operating blade 15 on another cutter in shearing relation with the same. The ends of the cutting edge 15 are bounded by the notches 16, 16 in the cutter, said notches leaving the bonds 12 in the sheet metal. The side edges of the blade 15 are indicated by 15', 15' and it is to be particularly noted that these edges of the blade 15 are parallel to each other. This is the principal feature of my invention. These parallel edges are carried up to a circumference, as indicated by 17, which may be the grinding limit of the particular cutter shown. That is, the cutter may be reduced in diameter by grinding or sharpening until the circumference 17 is reached without shortening the length of the slits made by the cutting edge 15. If the sides 15', 15' of the blade 15 were not parallel but substantially radial with respect to the disk, then it will be seen that reducing the diameter of the disk would result in shortening the length of the cutting edge 15.

Making the terminal edges 15', 15' of one blade 15 substantially parallel results in making the notches 16 substantially sector shape, or tapered somewhat from the periphery of the disk toward the center. That is, the adjacent edges 15' bounding one of the notches 16 are not parallel to each other but converge toward each other from the periphery of the disk inwardly so that as the disk is sharpened and reduced in diameter, the length of the bond 12 left in the metal by the notch 16 will be shortened.

As an example, I may state that a new cutter eight inches in diameter may be reduced by sharpening to a diameter of seven and one-half inches, or less. With the old type of cutter, this might result in a reduction in length of the completed lath or expanded metal of two or three inches in a strip substantially one hundred inches long, because the slits are shorter and therefore the sheet must be stretched more transversely to widen the opening of the slits, with a consequently greater reduction in the length of the expanded sheet. A loss of metal thus results, and a further disadvantage lies in the weakening of the product if the degree of opening of the slits is increased too much.

The manner in which the shortening of the length of the slit in the use of cutters of the prior art causes a reduction in the length of the completed metal may be understood more clearly by reference to Figs. 3 to 6, inclusive. In Fig. 3, one of the slits is indicated by 11a and the bonds by 12a. This piece of metal is shown expanded in Fig. 4. It is to be understood that the transverse expansion distance, as indicated by 18, is constant. As shown in Fig. 4, when the metal is expanded, the slit 11a is opened up as indicated. The transverse expansion 18 given to the strip causes a certain amount of contraction in the length of the same, depending upon the length of the slit 11a. For example, with a strip as shown in Fig. 5 where the slits 11b are shorter than those indicated by 11a and where the transverse expansion, as indicated by 18' is the same as indicated by 18 in Fig. 4, the longitudinal contraction of the piece of metal is somewhat more.

For example, the longitudinal distance after a contraction using the long slit is indicated by 19 in Fig. 4. With the shorter slit, this distance is indicated by 19' in Fig. 6 and it will be seen that 19' is shorter than 19. It will be seen, therefore, that commencing with two pieces of metal of the same length and width, and providing one with long slits and the other with short slits, and expanding each one to the same width, the one with the long slits will be longer after completion than the one with the short slits.

According to the preferred form of the present invention, the length of the slits is held constant however much the cutter is ground down, so that the above-mentioned disadvantages of loss of metal and weakening of the product are eliminated. It will be understood that the actual shortening of the bonds as the cutter is ground down is so slight as to be inconsequential, the important factor being the avoidance of undue shortening of the slits.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible, in view of the prior art.

What I regard as new, and desire to secure by Letters Patent, is:

1. A rotary cutter comprising a disc for forming spaced slits in metal to be expanded, one wall of said disc being provided with uniformly spaced notches intercepting the peripheral cutting edge of said disc, said notches flaring toward the periphery of the disc whereby the length of slits produced by the cutter will not be shortened as the cutter wears down.

2. A rotary cutter comprising a disc for forming spaced slits in metal to be expanded, said disc being provided with sector-shaped notches intercepting the peripheral cutting edge of said disc, said notches forming individual cutting blades with substantially parallel sides extending inwardly into said cutter, so that the length of slits in the metal produced by said blades, will remain constant as said cutter is reduced in diameter because of wear.

3. A metal lath slitting disk having radial notches in a side thereof opening through the outer edge of the disk, said notches being of progressively decreasing width toward the center of the disk.

4. A metal lath slitting disk having elongated tapered notches equally spaced along the periphery at the sides, the notches on opposite sides being in staggered relation, the bases of the notches being in the circumference, and the apices of the notches being toward the center.

5. A rotary cutter comprising a disc for forming spaced slits in metal to be expanded, one wall of said disc being provided with uniformly spaced notches intercepting the peripheral cutting edge of said disc, said notches being wider at the periphery of said disc than at points closer to the center of said disc, whereby the bonds between the slits produced by the cutter will be shortened as the diameter of the cutter is decreased.

ROBERT M. CHESNEY.